(12) United States Patent
Kelly

(10) Patent No.: US 7,846,573 B2
(45) Date of Patent: Dec. 7, 2010

(54) COOLANT MANIFOLD

(75) Inventor: Shad A. Kelly, Warren, MI (US)

(73) Assignee: Cobasys, LLC, Orion, MI (US)

( * ) Notice: Subject to any disclaimer, the term of this patent is extended or adjusted under 35 U.S.C. 154(b) by 790 days.

(21) Appl. No.: 11/809,925

(22) Filed: Jun. 1, 2007

(65) Prior Publication Data

US 2008/0299446 A1 Dec. 4, 2008

(51) Int. Cl.
*H01M 10/50* (2006.01)
*F16L 11/04* (2006.01)
*F16L 11/14* (2006.01)
*F16L 39/04* (2006.01)
*F16L 51/02* (2006.01)

(52) U.S. Cl. ............... 429/120; 138/118; 138/121; 285/128.1; 285/133.5

(58) Field of Classification Search ............. 138/118, 138/118.1, 120, 121, 122, 128.1; 429/71, 429/88, 120; 285/299, 133.21, 133.5, 133.6, 285/128.1
See application file for complete search history.

(56) References Cited

U.S. PATENT DOCUMENTS

| | | | | |
|---|---|---|---|---|
| 2,282,923 A | * | 5/1942 | Ambruster | ............... 429/120 |
| 3,834,945 A | * | 9/1974 | Jensen | ............... 429/120 |
| 4,810,008 A | * | 3/1989 | Brodie | ............... 285/133.4 X |
| 5,090,743 A | * | 2/1992 | Obering | ............... 285/133.21 |
| 5,305,799 A | * | 4/1994 | Dal Palu | ............... 138/121 |
| 5,395,708 A | | 3/1995 | Hall | |
| 5,524,681 A | | 6/1996 | Davies et al. | |
| 6,042,961 A | * | 3/2000 | Verhoog et al. | ......... 429/120 X |
| 6,106,972 A | | 8/2000 | Kokubo et al. | |
| 6,129,120 A | * | 10/2000 | Margot | ............... 138/121 |
| 6,344,728 B1 | | 2/2002 | Kouzu et al. | |
| 6,512,347 B1 | | 1/2003 | Hellmann et al. | |
| 6,962,224 B2 | | 11/2005 | Nakanowatari | |

* cited by examiner

Primary Examiner—Stephen J. Kalafut

(57) ABSTRACT

A battery assembly may include a cooling system assembly having first and second battery modules and a coolant manifold in fluid communication therewith. The first battery module may include a first coolant flow path and the second battery module may include a second coolant flow path. The coolant manifold may include first and second ports and a main body portion to provide expansion and contraction between the first and second ports. The first port may be in communication with the first flow path and the second port may be in communication with the second flow path.

17 Claims, 5 Drawing Sheets

COOLANT MANIFOLD

FIELD

The present disclosure relates to battery assemblies and, more specifically, to coolant manifolds for battery assemblies.

BACKGROUND

The statements in this section merely provide background information related to the present disclosure and may not constitute prior art.

Typically, coolant manifolds for battery assemblies include generally rigid members and are assembled from multiple components. These manifolds typically cannot accommodate battery assemblies having battery modules with varying widths. Additionally, separate O-rings are often used to form a seal between the coolant manifold and the battery modules. The inflexibility to design variation and multiple component structure may result in an increased part cost and additional assembly time, as well as increased potential for part failure.

SUMMARY

A battery system may include a cooling system assembly having first and second battery modules and a coolant manifold in fluid communication therewith. The first battery module may include a first coolant flow path and the second battery module may include a second coolant flow path. The coolant manifold may include first and second ports and a main body portion to provide expansion and contraction between the first and second ports. The first port may be in communication with the first flow path and the second port may be in communication with the second flow path.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
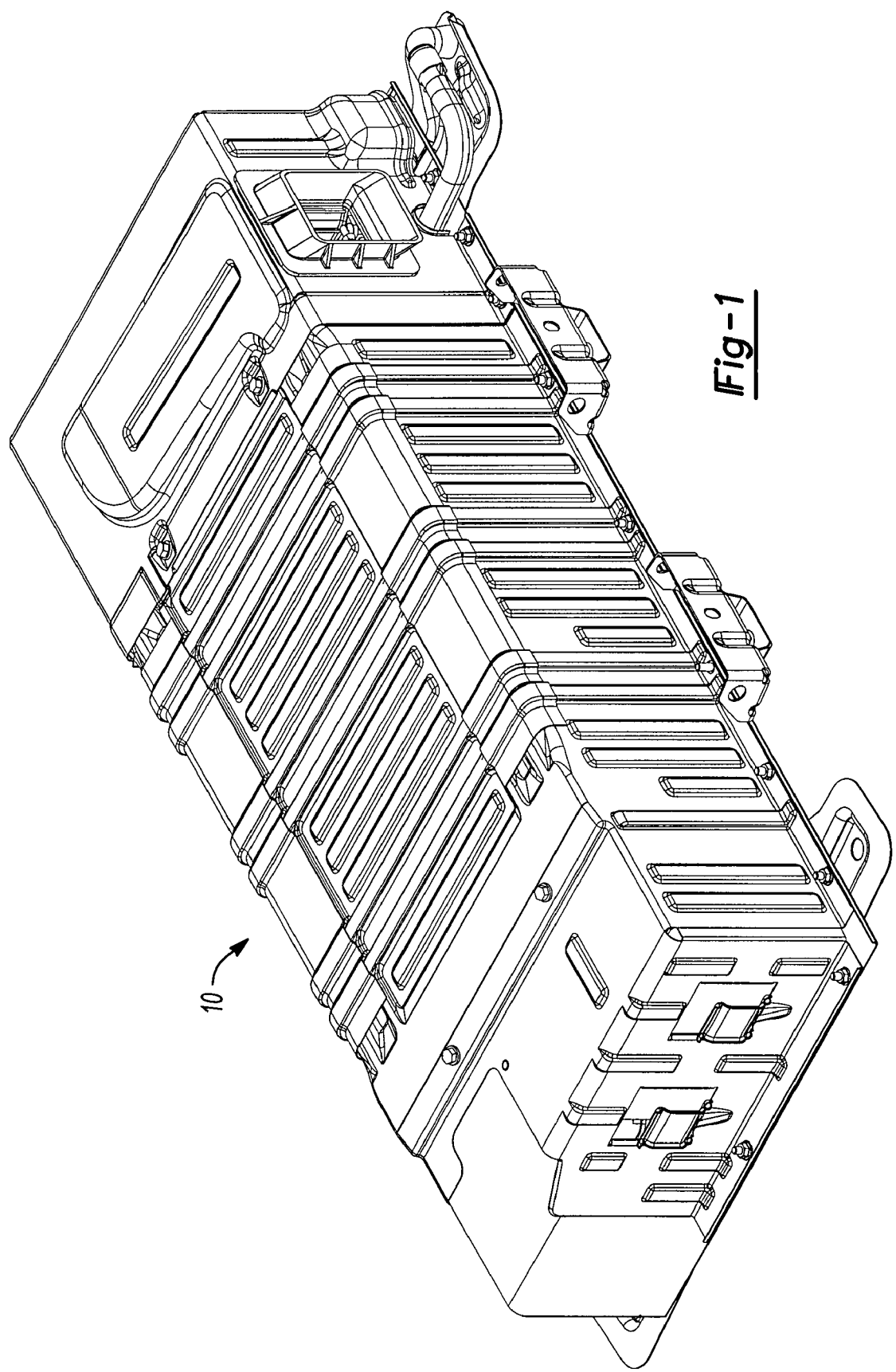
FIG. 1 is a perspective view of a battery assembly according to the present disclosure.
Figure 2:
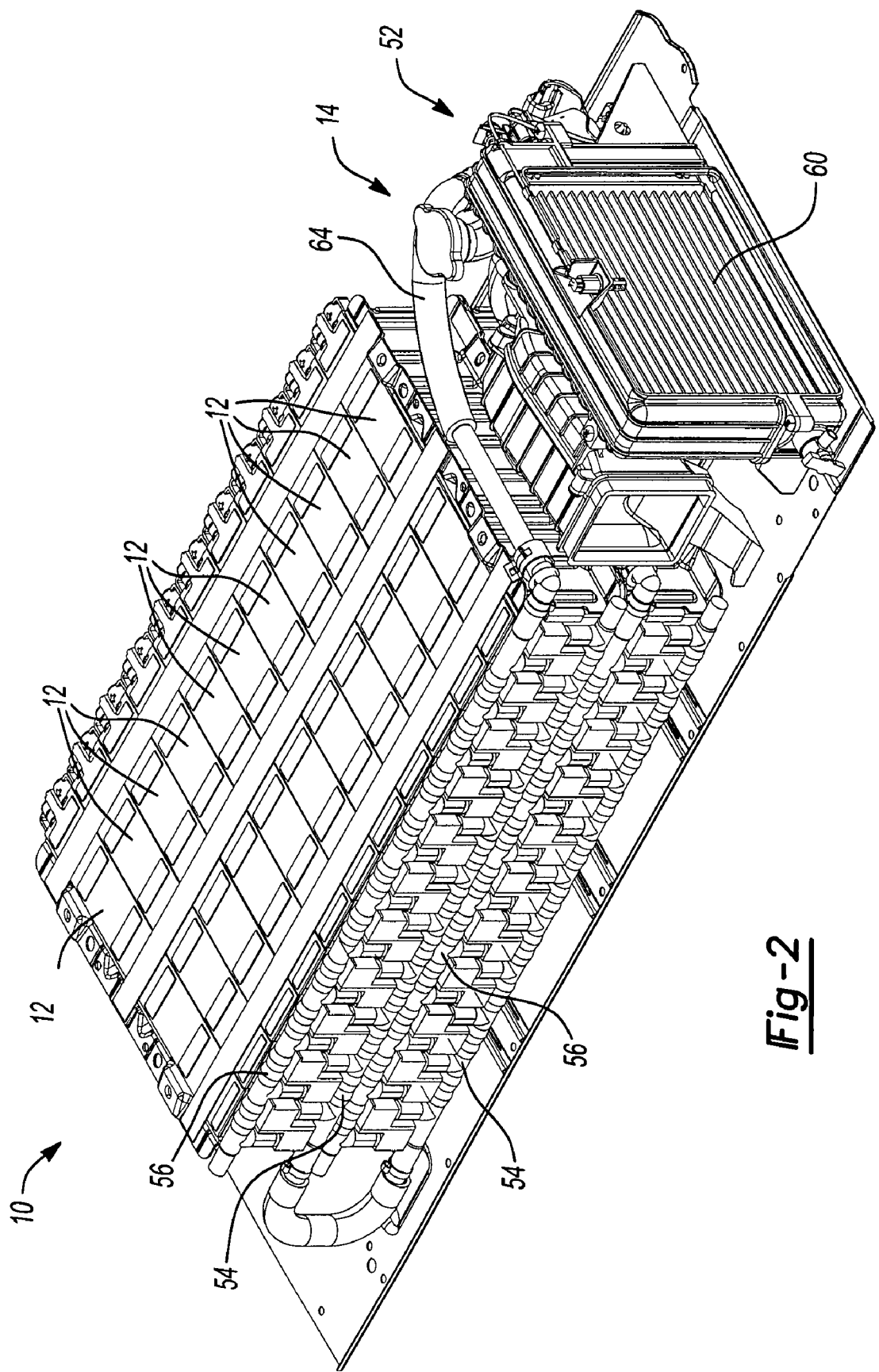
FIG. 2 is a partially exploded perspective view of the battery assembly of FIG. 1.
Figure 3:
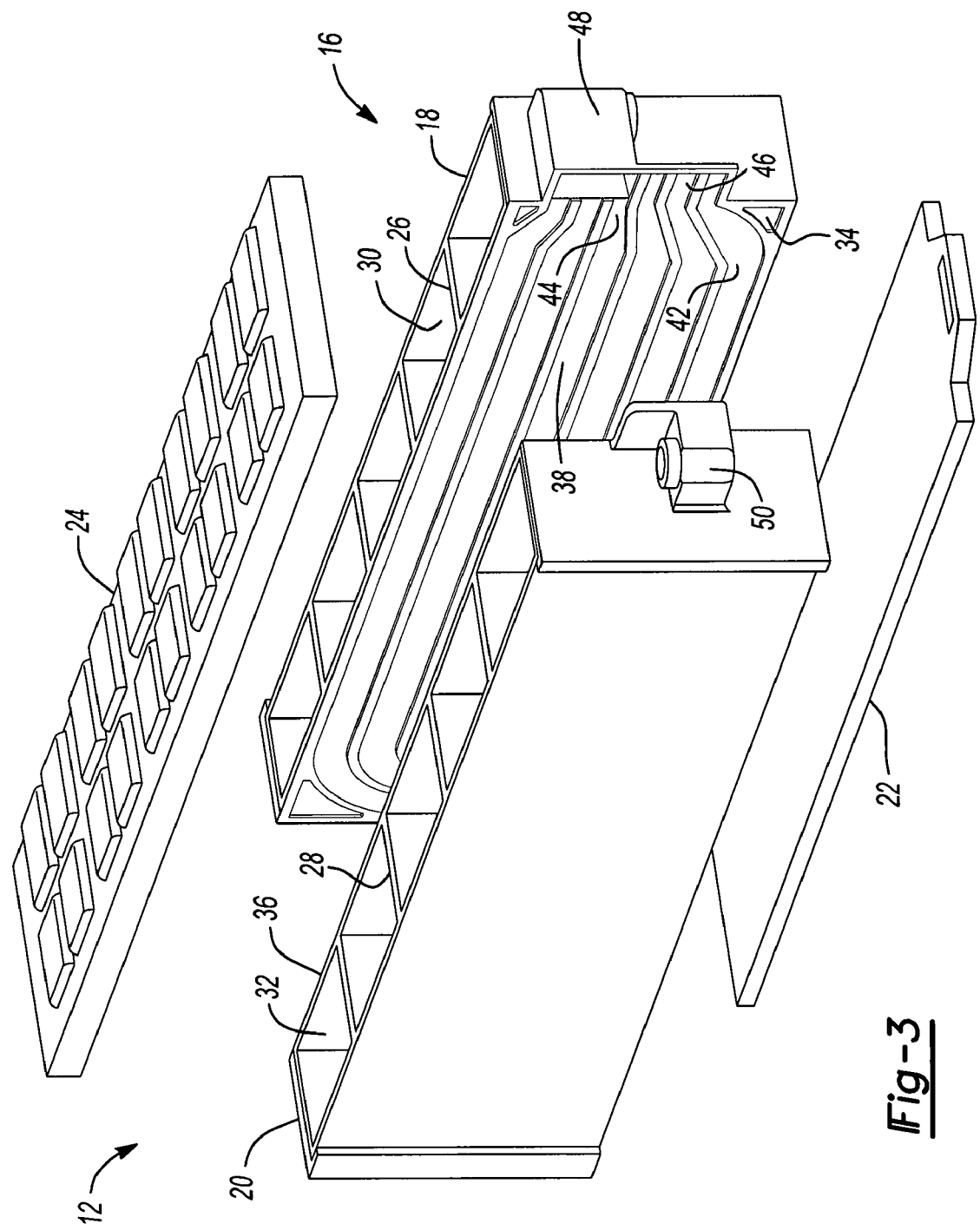
FIG. 3 is an exploded perspective view of a battery module of the battery assembly of FIG. 1.

With reference to FIGS. 1 and 2, a battery assembly 10 may include a series of battery modules 12 and a cooling system 14. Battery modules 12 may be generally similar to one another. Therefore, a single battery module 12 will be discussed below, with the understanding that the description applies equally to the remainder of battery modules 12. With additional reference to FIG. 3, battery modules 12 may include a case 16 having first and second battery containers 18, 20, a base 22, and a lid 24. First and second battery containers 18, 20 may each include battery partitions 26, 28 forming a series of battery compartments 30, 32.

Adjacent faces 34, 36 of first and second battery containers 18, 20 may each include a recess 38 (in face 34 and not shown in face 36) formed therein, forming a sealed coolant flow path 42 when first and second battery containers 18, 20 are coupled to one another. Flow path 42 may be generally serpentine in construction and may include an inlet 44 and an outlet 46. First battery container 18 may include an inlet port 48 and second battery container 20 may include an outlet port 50.

Inlet port 48 may be generally cylindrical and may extend upwardly relative to base 22. Inlet port 48 may form an inlet for flow path 42. Outlet port 50 may be generally cylindrical and may extend downwardly relative to lid 24. Outlet port 50 may form an outlet for flow path 42. First and second battery containers 18, 20 may each be formed as a unitary one-piece construction.

Battery assembly 10 may include a variety of positive and negative active battery materials, including any types of active battery materials used in the art. Positive electrode active battery materials may be used including powders of lead oxide, lithium cobalt dioxide, lithium nickel dioxide, lithium manganese oxide compounds, lithium vanadium oxide compounds, lithium iron oxide, and lithium compounds (i.e., complex oxides of the compounds previously mentioned and transition metal oxides, manganese dioxide, zinc oxide, nickel oxide, nickel hydroxide, manganese hydroxide, copper oxide, molybdenum oxide, and/or carbon fluoride). More specifically, the positive electrode active battery material may include a nickel hydroxide material.

Negative electrode active battery materials may include metallic lithium, as well as like alkali metals and alloys thereof, alkali metal absorbing carbon materials, zinc, cadmium hydroxide, and hydrogen absorbing alloys. More specifically, the negative electrode active battery materials may include a hydrogen absorbing alloy (also referred to as a hydrogen storage alloy). While the discussion above includes specific examples, it is understood that any hydrogen absorbing alloy may be used.

A variety of combinations of positive and negative active battery materials may be used with the battery assembly 10 according to the present disclosure. More specifically, battery assembly 10 may include a series of batteries in the form of electrochemical cells. Each electrochemical cell may include a nickel-metal hydride cell having positive and negative electrodes. The positive electrodes may include nickel hydroxide as the active material. The negative electrodes may include hydrogen absorbing alloy materials as the active materials.

Cooling system 14 may be a liquid cooling system and may be utilized to effectuate temperature control of battery assembly 10. As the batteries of battery assembly 10 charge and discharge, heat is produced. Cooling system 14 may provide coolant flow through battery assembly 10 in order to absorb heat from battery assembly 10. Cooling system 14 may include a climate control system 52 and a series of inlet and exhaust coolant manifolds 54, 56.

Climate control system 52 may include a coolant pump (not shown), a radiator 60, an inlet line (not shown), and an outlet line 64. The coolant pump may generally provide for a flow of coolant through cooling system 14. More specifically, the coolant pump may force a flow of coolant through radiator 60, outlet line 64, inlet coolant manifolds 54, coolant flow paths 42, exhaust coolant manifolds 56, the inlet line, and back to the coolant pump, forming a cooling loop. The coolant used in cooling system 14 may include a variety of coolants, such as a 50/50 mixture of ethylene glycol and water.

Inlet coolant manifolds 54 may be in communication with inlet ports 48 of battery modules 12 and exhaust coolant manifolds 56 may be in communication with outlet ports 50 of battery modules 12. Inlet and exhaust coolant manifolds 54, 56 may be generally similar to one another. For simplicity, only inlet coolant manifold 54 will be discussed in detail with the understanding that the description applies equally to exhaust coolant manifold 56.

Figure 4:
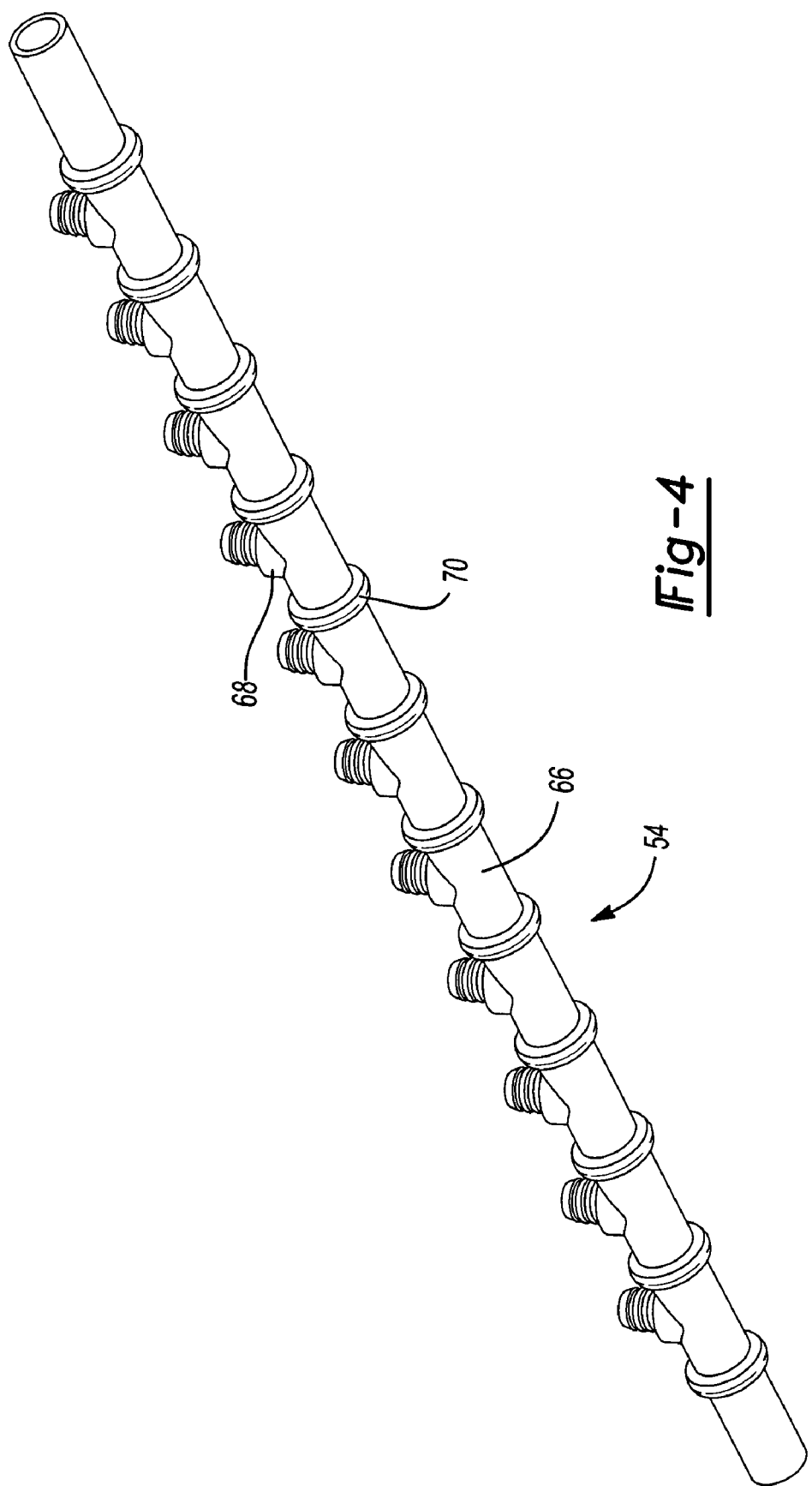
FIG. 4 is a perspective view of a coolant manifold of the battery assembly of FIG. 1.

With additional reference to FIG. 4, inlet coolant manifold 54 may include a generally cylindrical main body portion 66 having a series of ports 68 extending therefrom and in fluid communication with inlet ports 48 of battery modules 12. Inlet coolant manifold 54 may further include bellows 70 in main body portion 66 between adjacent ports 68. Bellows 70 may generally allow for expansion and/or contraction of inlet coolant manifold 54 to accommodate varying distances between inlet ports 48 of battery modules 12. More specifically, first and second bellows 70 adjacent one another may be disposed between adjacent ports 68.

Figure 5:
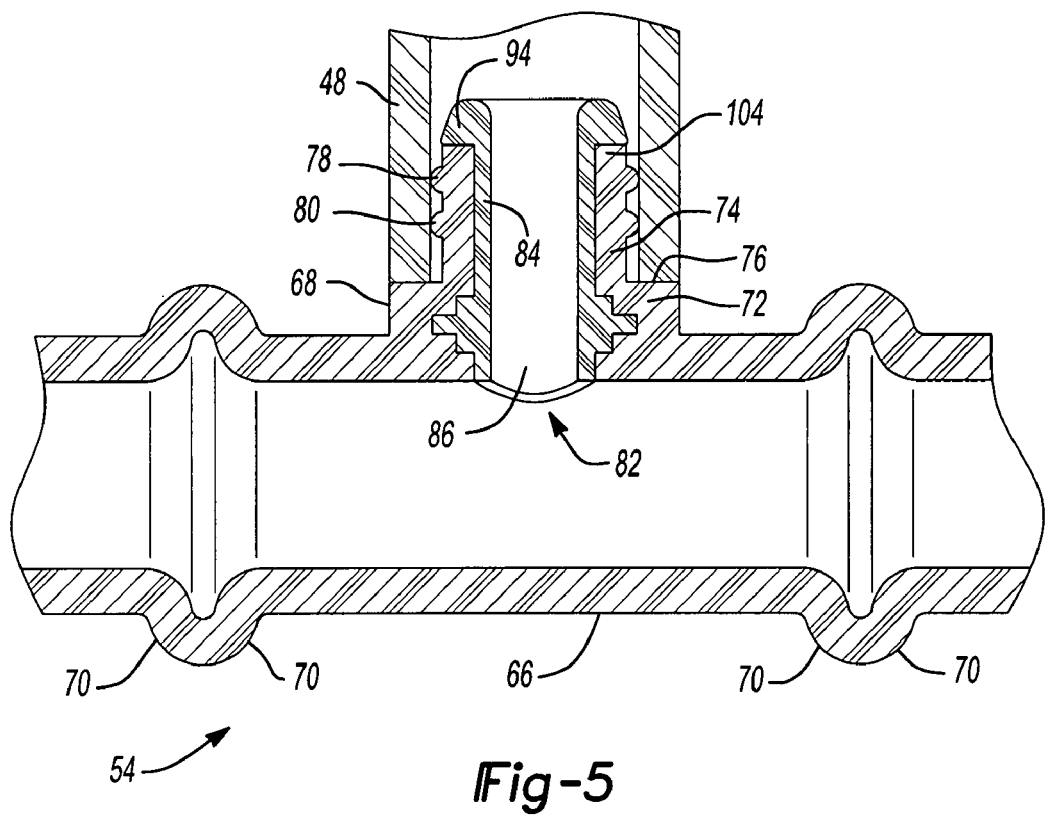
FIG. 5 is a fragmentary section view of the battery assembly of FIG. 1.

With additional reference to FIG. 5, each of coolant manifold ports 68 may be in the form of a male port and may extend from coolant manifold main body portion 66 at approximately a ninety degree angle. Ports 68 may be integrally formed with main body portion 66. Port 68 may be a generally cylindrical member having first and second portions 72, 74. First portion 72 may be located adjacent main body portion 66 and may have a first diameter. Second portion 74 may be located adjacent first portion 72 and generally outward relative to main body portion 66. Second portion 74 may have a second diameter generally less than the first diameter, forming an annular surface 76 between first and second portions 72, 74. Second portion 74 may include first and second ring-like protrusions 78, 80 extending around an entire circumference thereof.

Main body portion 66 and ports 68 may be integrally molded from a compliant material. Compliant materials may include any appropriate rubber material, such as an ethylene propylene diene monomer rubber mixed with polypropylene. For example, main body portion 66 and ports 68 may be formed from Santoprene®. More specifically, main body portion 66 and ports 68 may be formed from a material having a stiffness less than 8.3 MPa ultimate tensile strength in order to allow for expansion and contraction of main body portion 66 and to accommodate sealing using protrusions 78, 80, as discussed below.

Figure 6:
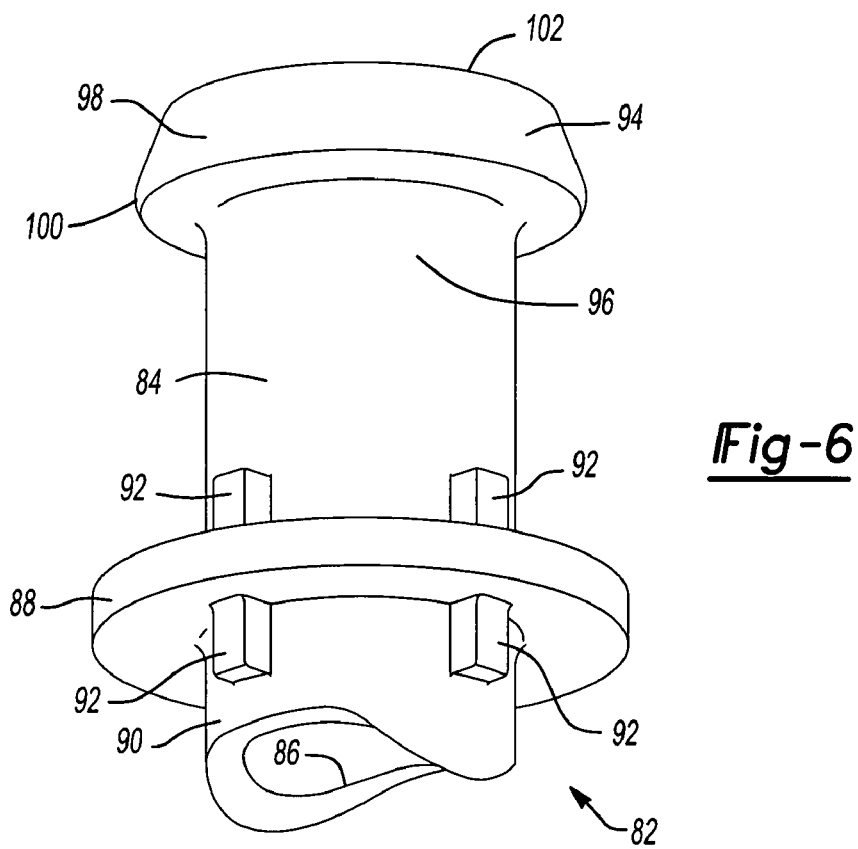
FIG. 6 is a perspective view of an insert of the coolant manifold of FIG. 4.

Inlet coolant manifold 54 may further include inserts 82 contained within ports 68. Insert 82 may be made from polypropylene. More specifically, insert 82 may be formed from a material having a stiffness greater than the stiffness of the material forming port 68. For example, the stiffness of the material forming insert 82 may be between 24 MPa and 34 MPa ultimate tensile strength. With additional reference to FIG. 6, inserts 82 may have a generally cylindrical body 84 defining a central coolant passage 86. Retention and anti-rotation features may be formed on body 84.

More specifically, a protrusion 88 may extend circumferentially about a first end portion 90 of body 84 and radially outwardly therefrom, generally preventing axial displacement of insert 82 within port 68. An additional set of protrusions 92 may also extend circumferentially about first end portion 90. Protrusions 92 may have a circumferential extent less than the entire circumference of body 84, generally preventing rotation of insert 82 within port 68. Insert 82 may include a radially outwardly extending lip portion 94 at a second end portion 96 thereof. Lip portion 94 may include a generally tapered sidewall 98 and rounded upper and lower edges 100, 102. Upper edge 100 may have an outer diameter greater than the outer diameter of an end 104 of port 68.

As seen in FIG. 5, coolant manifold port second portion 74 may be inserted into inlet port 48 of battery module 12. Inlet port 48 may abut coolant manifold port annular surface 76 to prevent over-insertion of coolant manifold port second portion 74 into inlet port 48. Coolant manifold port second portion 74 may be prevented from peeling back during insertion into inlet port 48 due to the larger diameter of upper edge 100 of insert 82. Protrusions 78, 80 may abut an inner surface of inlet port 48, providing a sealed engagement therebetween.

Inlet coolant manifold 54 may be formed by first placing inserts 82 into a tool and then injecting santoprene into the closed tool, forming an inlet coolant manifold 54 with inserts 82 integrally molded therein. Inlet coolant manifold 54 may accommodate any number of battery modules by simply modifying the number of ports 68 and corresponding inserts 82.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A coolant manifold comprising:
   a first port;
   a second port;
   a main body portion disposed between said first and second ports to provide expansion and contraction between said first and second ports to allow displacement of said first and second ports relative to one another; and
   an insert disposed within said first port, said insert having a stiffness greater than a stiffness of said main body portion, wherein said insert includes a radially outwardly extending portion extending radially into said first port to inhibit axial displacement of said insert relative to said first port.

2. The coolant manifold of claim 1, wherein said insert is retained within an inner circumferential portion of said first port.

3. The coolant manifold of claim 2, wherein said first port is molded around said insert.

4. The coolant manifold of claim 1, wherein said radially outwardly extending portion extends about a circumference of said insert, said circumferential extent being less than the entire circumference of said insert to inhibit rotation of said insert relative to said first port.

5. The coolant manifold of claim 1, wherein said insert includes a radially outwardly extending portion at an end thereof, said radially outwardly extending portion abutting an end of said first port and extending radially outwardly relative to said end of said first port.

6. The coolant manifold of claim 1, wherein said insert is formed from a first material having an ultimate tensile strength greater than 24 MPa and said first port is formed from a second material having an ultimate tensile strength of less than 8.3 MPa.

7. The coolant manifold of claim 6, wherein said first material includes polypropylene and said second material includes a rubber.

8. The coolant manifold of claim 1, wherein said first port includes a generally cylindrical body extending from said main body portion, said generally cylindrical body including an integrally formed sealing ring extending about an outer circumference thereof.

9. The coolant manifold of claim 1, wherein said main body portion includes a bellows disposed between said first and second ports to provide expansion and contraction therebetween.

10. A cooling system assembly comprising:
a first battery module including a first coolant flow path;
a second battery module including a second coolant flow path; and
a coolant manifold including first and second ports and a main body portion to provide expansion and contraction between said first and second ports, said first port in communication with said first coolant flow path and said second port in communication with said second coolant flow path, wherein said coolant manifold includes an insert disposed within said first port, said insert having a stiffness greater than a stiffness of said main body portion.

11. The cooling system assembly of claim 10, wherein said insert is retained within an inner circumferential portion of said first port.

12. The cooling system assembly of claim 10, wherein said insert is formed from a first material having an ultimate tensile strength greater than 24 MPa and said first port is formed from a second material having an ultimate tensile strength of less than 8.3 MPa.

13. The cooling system assembly of claim 12, wherein said first material includes polypropylene and said second material includes a rubber.

14. The cooling system assembly of claim 10, wherein said first port is molded around said insert.

15. The cooling system assembly of claim 10, wherein said first port includes a generally cylindrical body extending from said main body portion, said generally cylindrical body including an integrally formed sealing ring extending about an outer circumference thereof.

16. The cooling system assembly of claim 10, wherein said main body portion includes a bellows disposed between said first and second ports to provide the expansion and contraction therebetween.

17. A coolant manifold comprising:
a first port;
a second port;
a main body portion disposed between said first and second ports to provide expansion and contraction between said first and second ports to allow displacement of said first and second ports relative to one another, wherein said first port includes a generally cylindrical body extending from said main body portion, said generally cylindrical body including an integrally formed sealing ring extending about an outer circumference thereof, and wherein said first battery module includes a coolant port in communication with said first coolant flow path, said first port of said coolant manifold extending into said coolant port and said sealing ring being compressed between an outer circumference of said first port of said coolant manifold and an inner circumference of said coolant port.

* * * * *

UNITED STATES PATENT AND TRADEMARK OFFICE
CERTIFICATE OF CORRECTION

| | | |
|---|---|---|
| PATENT NO. | : 7,846,573 B2 | |
| APPLICATION NO. | : 11/809925 | |
| DATED | : December 7, 2010 | |
| INVENTOR(S) | : Kelly | |

It is certified that error appears in the above-identified patent and that said Letters Patent is hereby corrected as shown below:

Column 4, line 17                    Delete "santoprene" and insert --Santoprene®--.

Signed and Sealed this
Twenty-second Day of February, 2011

David J. Kappos
*Director of the United States Patent and Trademark Office*